June 22, 1965   E. LOWE ETAL   3,190,331
METHOD FOR PIERCING PEAS
Original Filed Jan. 4, 1963   2 Sheets-Sheet 1

E. LOWE & E.L. DURKEE
INVENTORS
BY R. Hoffman
W. Bier
ATTORNEYS

United States Patent Office 3,190,331
Patented June 22, 1965

3,190,331
METHOD FOR PIERCING PEAS
Edison Lowe, El Cerrito, and Everett L. Durkee, El Sobrante, Calif., assignors to the United States of America as represented by the Secretary of Agriculture
Original application Jan. 4, 1963, Ser. No. 249,541, now Patent No. 3,141,484, dated July 21, 1964. Divided and this application Dec. 3, 1963, Ser. No. 331,984
1 Claim. (Cl. 146—242)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a division of our application Ser. No. 249,541 filed January 4, 1963, now Patent No. 3,141,484, granted July 21, 1964.

This invention relates to and has among its objects the provision of methods for piercing peas or other food products Further objects of the invention will be obvious from the following description taken in conjunction with the annexed drawing.

Figure 1:
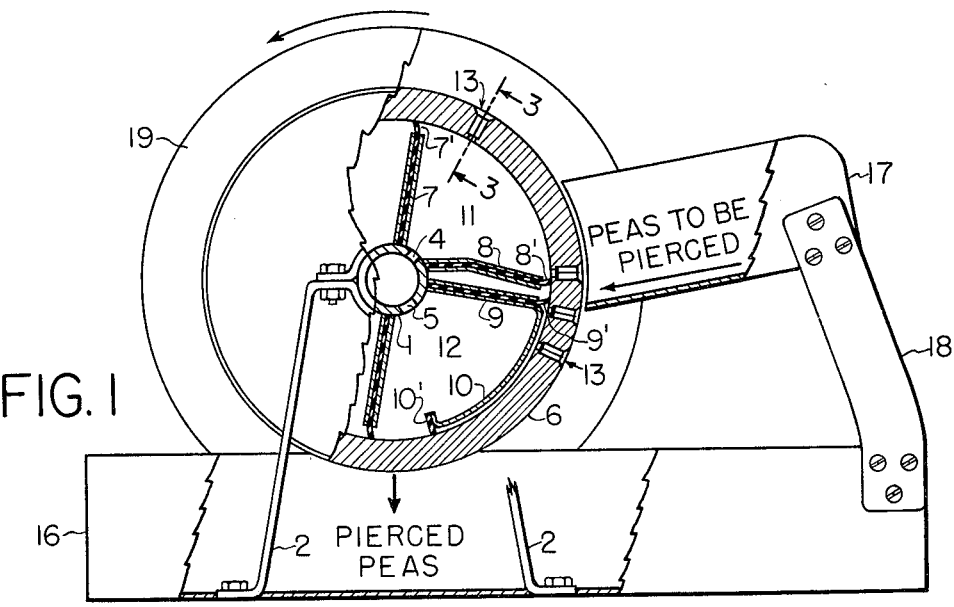
Figures 3, 4:
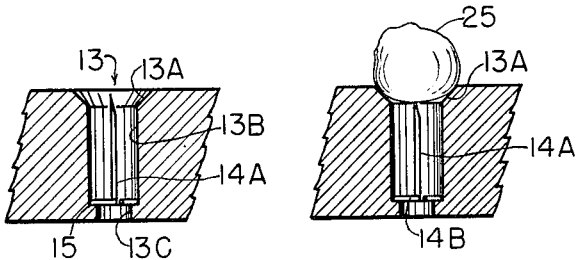
Figure 5:
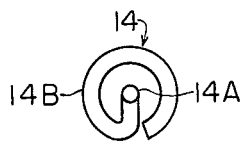
Figure 2:
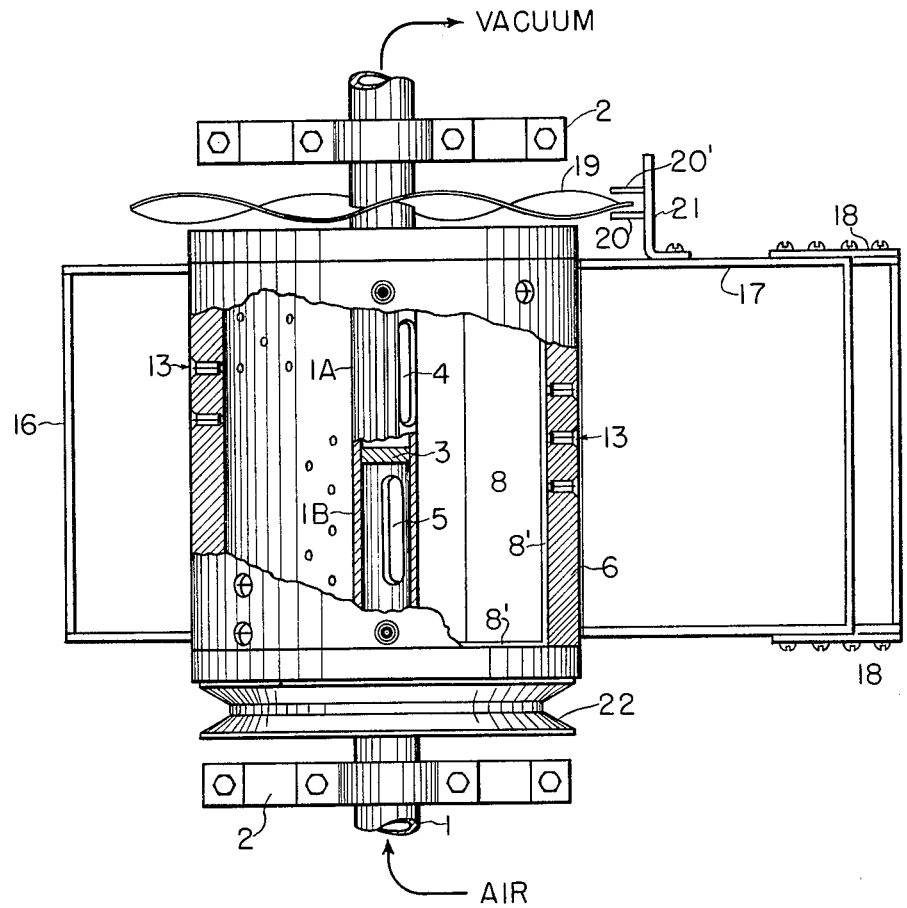

The drawing annexed hereto discloses a device for practicing the invention wherein FIG. 1 is an elevation of the device and FIG. 2 is a plan view. In both of these figures parts have been cut away for clarity of representation. FIGURE 3 is a section, on an enlarged scale, taken on plane 3—3 of FIG. 1. FIGURE 4 is a view similar to that of FIG. 3 but with a pea in operative position. FIGURE 5 is a plan view of one of the pea-piercing pins 14 on a greatly enlarged scale.

In the preparation of dehydrated peas it is well known that the peas are preferably pierced prior to application of the drying procedure. Such piercing is advantageous in that evaporation of moisture can occur at an acceptable rate. Various types of apparatus have been proposed for piercing peas but in general these devices are complicated and expensive and are not completely satisfactory because they tend to mash the peas, disengage the skin from the endosperm, and become clogged or fouled by debris requiring frequent shut-down for cleaning.

The method in accordance with the invention surmounts the disadvantages noted above. A primary feature of the method of the invention is that it is simple in operation. Mashing of the peas does not occur as they are not subjected to any shearing, compression, or other undesired forces. The piercing takes place rapidly and effectively with no tendency of the skins to be stripped off or the tissue of the peas to be damaged in any way. Another point is that the device used to practice the method of the invention does not become clogged because the pierced peas are ejected cleanly and positively from the apparatus without leaving any tissue fragments or other debris on the mechanism. A further advantage is that the operation of the method of the invention is controlled by simple and effective means whereby it can be quickly adjusted to different conditions, e.g., batches of peas of different texture or degree of maturity.

Referring now to the drawing, the device includes a stationary shaft 1 clamped to and supported by legs 2. Shaft 1 is hollow and is divided into two sections 1A and 1B by plug 3. Section 1A is connected to a suitable source of vacuum while section 1B is connected to a suitable source of compressed air. Shaft sections 1A and 1B are equipped with ports 4 and 5, respectively, to provide communication between the shaft sections and the interior of drum 6 as hereinafter explained.

Rotatably mounted on fixed shaft 1 is a hollow drum 6 which cooperates with said shaft in the following manner. On shaft 1 are mounted a series of vanes 7, 8 and 9, each composed of thin sheets of metal with thin strips 7', 8', and 9' between them. These strips, made of rubber, Neoprene, or similar elastic material, extend beyond the ends and edges of the metal sheets to provide a sealing effect as they wipe against the inner periphery and inner faces of drum 6. The vanes 7, 8, and 9 thus cooperate with the inner surface of drum 6 to provide two isolated (non-communicating) zones within drum 6. One of these zones, designated 11, communicates with shaft section 1A through port 4 and is thus maintained under vacuum whereas the other zone, 12, communicates with shaft section 1B through port 5 and is thus maintained under pressure. In the illustrated modification of the apparatus, vane 9 is provided with an arcuate leg 10 and a sealing strip 10'. The purpose of this arrangement is primarily to narrow the area within which pierced peas are discharged from the system as will be explained hereinbelow.

The cylindrical surface of drum 6 is provided with a series of apertures uniformly spaced over the available area. (To simplify the drawing, only a representative number of apertures are depicted in FIGS. 1 and 2.) Each aperture, generally designated as 13, includes a vestibule or unit-receiving cavity 13A which is provided to receive the pea (or other food unit) to be pierced. The aperture also includes a bore connecting the cavity 13A with the interior of drum 6, this bore being divided into a section 13B of relatively large diameter and a section 13C of relatively small diameter. Within each aperture 13 is positioned a pea-piercing pin 14. As is evident in FIGS. 3, 4, and 5, these pins consist of a pointed shaft 14A and an open loop 14B. The pins are fabricated of spring-tempered metal and are inserted in apertures 13 while compressing loop 14B. The pins are springedly held in place by tension of the expanded loop against the sides of bore 13B and resting on shoulder 15 between bores 13B and 13C. This resilient type of mounting is very convenient in replacing broken and/or bent pins.

Beneath drum 6 and shaft 1 is provided a hopper 16 for receiving pierced peas discharged from drum 6. The arrangement for feeding peas into the system comprises a trough 17 mounted on flexible metal strips 18. To facilitate operation of the system, trough 17 is equipped with means to oscillate it in a horizontal plane. This means includes a disc 19 having a wavy surface mounted on drum 6 and the bracket 21 mounted on trough 17 and equipped with fingers 20, 20'. As disc 19 rotates, its wavy surface alternately pushes on fingers 20 and 20', causing tray 17 to be oscillated from side to side.

The means for rotating drum 6 comprises a pulley 22 attached to one end thereof. This pulley is connected by a belt to a conventional drive means to rotate it in the indicated direction. Conventional bearings are provided so that drum 6 and associated parts 19 and 22 can rotate freely as a unit about fixed shaft 1 and its associated parts, i.e., vanes 7, 8, 9, 10 etc.

In operating the device, the peas to be treated are placed in feed trough 17. By the effect of the vacuum in zone 11, individual peas are sucked into the cavities 13A wherein they are contacted by pins 14 and so pierced. It is evident that the oscillation of trough 17 promotes registry of the peas with the apertures and eliminates clogged or stagnant areas. The tapered construction of cavities 13A also assists in proper seating or registry of the peas. In FIG. 4 is shown a pea 25 seated in cavity 13A and pierced by pin 14. It is evident from this figure that cavity 13A and bore 13B are so proportioned that the peas fit snugly in the cavity but do not protrude to any substantial extent into bore 13B. As drum 6 rotates, the peas registered in the cavities 13A and impaled on pins 14 are carried counterclockwise until they are opposite the lower right-hand quadrant of drum 6. At this point the peas are subjected to pressure from zone 12 and they are ejected from the cavity and pin and drop into hopper 16. The empty cavities are now available for registry with a new batch of peas in feed trough 17. The action of the device is thus automatic and continuous and may be carried out for as long periods of time as desired. It is obvious that in operation of the device the operator of the system will adjust such items as the rate of rotation of drum 6, the vacuum in zone 11, and the pressure in zone 12 to attain optimum action. For example, the degree of vacuum in zone 11 should be adequate to positively suck the peas into cavities 13A so that they are pierced properly. However, one should avoid using such a degree of vacuum that the peas are mashed or ruptured by violent sucking action. It is also obvious that the degree of vacuum should not be so high as to elongate the peas and draw them into bores 13B. The numerical degree of vacuum cannot be specified because it will depend on such factors as the size and the number of apertures opening onto the vacuum zone 11 and the conditions of the peas—i.e., their texture, degree of maturity, variety, etc. In any particular case the degree of vacuum can easily be adjusted by observation of the system in action as noted above. In similar manner, the pressure of air in zone 12 is controlled by the operator during the run and adjusted to such a degree that the pierced peas are dislodged effectively yet without so much force that they will be mashed against the bottom of hopper 16.

Although the method of the invention finds its greatest field of usefulness in the treatment of peas, it is obvious that it can be utilized for treatment of other types of food products. It is often desired in food processing to pierce the skins of produce for such purposes as to permit evaporation of moisture or to permit better penetration of liquids such as curing or preserving solutions. Thus, typical products to which the method can be applied are cranberries, beans, grapes, prunes, olives, cherries, etc. It is obvious that in any such application the size of apertures 13 is correlated with the size of the units of food being processed so that these units will seat properly in cavities 13A. Obviously a larger unit will require a larger cavity and vice versa. Moreover, any such adjustment of the size of the cavity will require adjustment of bore 13B so as to preserve the proper relationship, i.e., so that the food unit will fit into the cavity but not into the bore.

Having thus described our invention, we claim:

A method for piercing fresh green peas which comprises impaling peas on a piercing means solely by the action of a fluid pressure differential applied at a level sufficient to obtain effective piercing of the skin of the peas but insufficient to rupture or mash the peas, then ejecting the pierced peas from the piercing means solely by the action of a fluid pressure differential applied at a level sufficient to obtain a positive ejection but insufficient to cause rupture or mashing of the peas.

References Cited by the Examiner

UNITED STATES PATENTS

| | | | |
|---|---|---|---|
| 2,811,997 | 11/57 | Schmidt et al. | 146—241 |
| 2,998,041 | 8/61 | Urschel et al. | 146—56 |
| 3,028,893 | 4/62 | Cannell | 146—56 |

J. SPENCER OVERHOLSER, *Primary Examiner.*